3,479,126
PHTHALOCYANINE TYPE DYESTUFFS

Bernhard Kramer, Cologne-Braunsfeld, and Paul Weber, Cologne-Stammheim, Germany, assignors to Farbenfabriken Bayer Aktiengesellschaft, Leverkusen, Germany, a corporation of Germany
No Drawing. Filed May 2, 1966, Ser. No. 546,595
Int. Cl. D06p *1/38, 1/02, 1/68*
U.S. Cl. 8—26                                       13 Claims

ABSTRACT OF THE DISCLOSURE

A process for dyeing fibers comprising applying a two-component dyestuff wherein the first component comprises a 3-imino-isoindolenine capable of forming metal-containing phthalocyanine-type dyestuff and a metal compound capable of providing the metal for said dyestuff and wherein the second component comprises a mixture of a neutrally splittable diazo compound and an ice color coupling component.

---

The present invention is concerned with a process for dyeing and printing fibre materials.

We have found that valuable dyestuffs are obtained by using a mixture which consists, on the one hand, of a mixture A consisting of: (1) a 3-imino-isoindolenine suitable for the production of metal-containing phthalocyanines or metal-containing, phthalocyanine-like dyestuffs on the fibre and (2) the metal compound required for the formation of the metal-containing dyestuff; and, on the other hand, of a mixture B which consists of approximately equivalent parts of: (1) a neutrally splittable, stabilised diazo compound which contains a lower alkoxy radical in the radical of the diazo component in the o-position to the diazonium group and (2) an ice colour coupling component; and by applying this mixture to fibre materials in the manner customary for the production of dyestuffs from the mixtures A and B, and producing the dyestuffs on the fibre materials according to the methods known for these dyestuffs by a heat treatment, optionally in the presence of an acid, the mixtures A and B being preferably used in such amounts that the dyestuffs obtained from the mixture A and the mixture B, respectively, are present on the fibre materials in a ratio of about 2:1 to 1:2.

The production of metal-containing phthalocyanines or metal-containing, phthalocyanine-like dyestuffs from the mixture A is known. Phthalocyanine dyestuffs are those formed by condensing four benzopyrrole (isoindole) rings around a central metal atom. They are prepared by condensing 2-amino-5-imino-isoindolenines as follows:

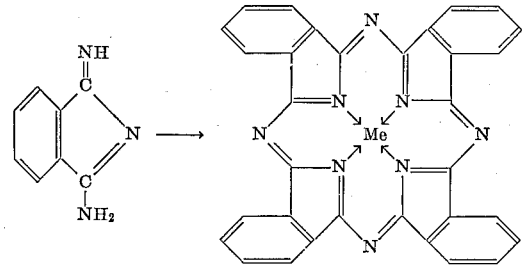

Phthalocyanine-like dyestuffs is a broader generic definition well known in the art, which includes phthalocyanine dyestuffs and other dyestuffs which are formed by condensing four heterocyclic rings around a central metal atom. Some phthalocyanine-like dyestuffs are typically prepared by condensing 2-amino-5-imino-pyrrolenines as follows:

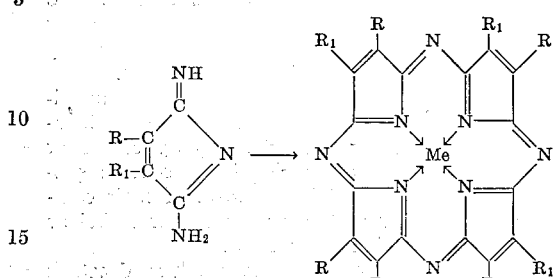

or pyrridopyrrolenines as follows:

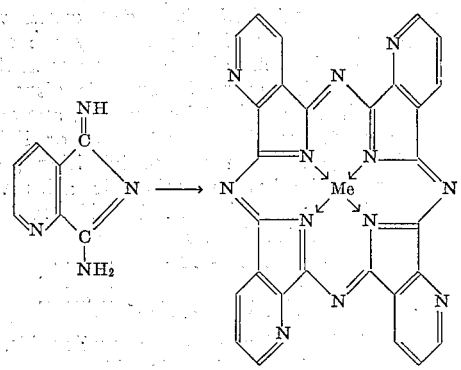

Both the species phthalocyanine and the subgeneric phthalocyanine-like compounds belong to the generic class of tetraazaporphines (oprphyrazines). The phthalocyanines are tetrabenzotetraazaporphines wherein the benzene nucleii can be substituted or unsubstituted with, for example, alkyl, alkoxy, or phenyl groups, or by halogen atoms. Phthalocyanine itself is the unsubstituted tetrabenzotetraazaporphine. Phthalocyanine-like dyestuffs then are those formed from heterocyclic nitrogen compounds such as the pyrrolenines or the pyrridopyrroles which have condensed around a metal atom as the benzopyrroles.

The following compounds may be used as 3-imino-isoindolenines; for example, 1-amino-3-imino-isoindolenines of the general formula:

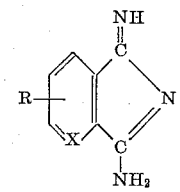

in which X stands for

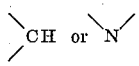

and R stands for a hydrogen atom or a substituent, such as an alkoxy radical, for example, a methoxy radical, or a phenyl radical. It is also possible to use 3-imino-isoindolenines which do not contain an aromatic radical and which may be characterised, for example, by the general formula:

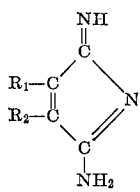

in which $R_2$ and $R_1$ stand, for example, for alkyl radicals, such as methyl or ethyl radicals. Instead of an amino radical, the 3-imino-isoindolenines may also contain other substituents, such as substituted amino groups or alkoxy groups, such as methoxy or hydroxyethyl groups.

The metals required for the production of the metal-containing phthalocyanines or metal-containing, phthalocyanine-like dyestuffs, for example, copper, cobalt or nickel, can be added by conventional methods. In general, these metals are added in the form of their compounds, such as copper acetate or the copper nickel or cobalt salts of alkylamino-acetic acids.

It was also previously known to produce dyestuffs from the components of mixture B. Compounds suitable for the process according to the present invention are neutrally splittable, stabilised diazo compounds which contain a lower alkoxy radical, preferably a methoxy group, in the radical of the diazo components in the o-position to the diazonium group, for example, diazoamino compounds which are obtained by coupling appropriate diazo or tetrazo compounds of the benzene or diphenyl series, which are free from water-solubilising groups, with secondary amino-benzene-carboxylic acids which may contain further substituents. Suitable secondary aminobenzene carboxylic acids are 1-alkylamino-4-sulphobenzene-2-carboxylic acids,
1-alkylamino-5-sulphobenzene-2-carboxylic acids,
N-alkylaminobenzene-o-carboxylic acids,
N-alkylaminochlorinated-benzene-o-carboxylic acids,
4-methoxyphenyl-glycine-o-carboxylic acid,
N-hydroxyethyl-anthranilic acid,
N-methoxyanthranilic acid,
N-alkylanthranilic acid,
N-phenyl-glycine-alkyl ester-o-carboxylic acids,
N-phenyl-glycine-amido-o-carboxylic acid,
1-N-sulpho-methylaminobenzene-2-carboxylic acid,
or methylamino-ethane-sulphonic acid.

Some diazoamino compounds with aliphatic stabilising amines can be split neutral and can, therefore, be used for the present process but, in general, these compounds are of little interest. Obviously the neutrally splittable diazoamino compounds can also be split in the presence of acids, as is well known.

Diazo compounds in the aforesaid diazoamino compounds can be prepared, for example, from 1-amino-2-methoxy-benzene-5-carboxylic acid-anilide,
2-amino-5-benzoyl-amino-1,4-diethoxybenzene,
2-amino-5-benzoylamino-1,4-dimethoxy-benzene,
1 amino-2,5-dimethoxy-4-benzonitrile,
1,4-dimethoxy-2-amino-phenyl-5-n-butyl-sulphone,
4-amino-2,5-dimethoxy-2',6'-dichloro-4'-nitro-azobenzene,
4-amino-3-methoxy-6,4'-dimethyl-2'-nitro-azobenzene,
5-nitro-2-amino-1-methoxy-benzene,
2-amino-1-methoxy-benzene,
2-amino-1methoxybenzene-4-ethyl-sulphone,
2-amino-1-methoxy-benzene-4-sulphonamide,
-dimethyl-sulphonamide or
-dimethyl-sulphonamide or -diethyl-sulphonamide,
4-chloro-2-amino-1-methoxy-benzene,
2-amino-1-methoxy-benzene-4-benzylsulphone,
1amino-2-methoxy-5-nitrobenzene,
4-amino-4'(p-amino-phenyl-amino)-2-ethoxy-5-methyl-azobenzene,
4-amino-4'-nitro-2,5-dimethoxy-azobenzene,
3-amino-6-benzoylamino-4-methoxy-toluene, dianisidine and other azoic diazo components which contain a lower alkoxy radical in the o-position to the diazotisable amino group.

Stabilizing amines for the aforesaid diazoamino compounds are, inter alia, 1-methylamino-4-sulphobenzene-2-carboxylic acid;
1-methylamino-5-sulphobenzene-2-carboxylic acid;
1-ethylamino-4-sulphobenzene-2-carboxylic acid;
1-ethylamino-5-sulphobenzene-2-carboxylic acid;
1-isopropylamino-4-sulphobenzene-2-carboxylic acid;
1-isopropylamino-5-sulphobenzene-2-carboxylic acid;
N-alkylaminobenzene-o-carboxylic acids such as 1-carboxymethylaminobenzene-2-carboxylic acid (phenyl-glycine-o-carboxylic acid),
3-chloro-phenyl-glycine-o-carboxylic acid,
4-chloro-phenyl-glycine-o-carboxylic acid,
4,6-dichloro-phenyl-glycine-o-carboxylic acid,
3,4-dichloro-phenyl-glycine-o-carboxylic acid,
3,6-dichloro-phenyl-glycine-o-carboxylic acid,
4-methoxy-phenyl-glycine-o-carboxylic acid;
N-isoalkylamino benzene-o-carboxylic acid;
N-hydroxyethyl-anthranilic acid;
N-methoxyethyl-anthranilic acid;
N-methyl-anthranilic acid;
N-ethyl-anthranilic acid;
N-butyl-anthranilic acid;
N-phenyl-glycine-alkyl ester-o-carboxylic acids;
N-phenylglycine-amide-o-carboxylic acid;
1-N-sulpho-methyl-amino-benzene-2-carboxylic acid;

and also the derivatives of the above-noted compounds containing substituents in the benzene nucleus comprising sulphonic acid amide, sulphone, or cyano groups.

Besides diazoamino compounds, there may also be used, as neutrally splittable, stabilised diazo compounds according to the present invention, the antidiazotates of o-amineo-alkoxy-aryl- compounds present in the known rapid fast dyestuffs.

The anti-diazotates may be represented by the general formula:

wherein R is an o-amino-alkoxy-aryl radical and M is a monovalent metal.

A large number of ice colour coupling components which are present, together with the neutrally splittable, stabilised diazonium compounds, preferably in an approximately equimolar proportion, are likewise known.

Ice color coupling components are illustrated by the members 1-(2',3'-hydroxynaphthoylamino)-2-methoxy-5-chlorobenzene,
2,3-hydroxynaphthoyl-2,4-dimethoxy-5-chloroaniline,
2',3'-hydroxynaphthoylaminobenzene,
1-acetoacetylamino-4-chloro-2,5-dimethoxybenzene,
or 2,3-hydroxyanthracene-carboxylic acid toluidine.

As has already been mentioned, the dyestuff mixtures used according to the present invention are applied in known manner to the materials to be dyed. In general, the procedure consists in transforming the dyestuffs mixtures into dyebaths or printing pastes by means of suitable solvents, such as alcohols, and known suitable emulsifiers and dispersing agents, as well as conventional dyeing adjuvants. Amine salts of oleyl- or lauroyl-sarcoside acids or levelling agents based on 1,3-bis-(2-ethylhexyl)-glycerol ether sulphate are preferably added to the dyestuff preparations, since particularly stable dyestuff preparations are thus obtained.

The materials to be dyed are treated with these dyebaths or printing pastes in the usual manner and the dyestuffs are developed by conventional methods by a heat treatment. The heat treatment can be carried out with dry heat or steam, possibly in the presence of acids. The after-treatment of the dyed materials is again performed in the manner known for the individual dyestuffs, for example by washing and soaping.

By using the dyestuff mixtures according to the present invention, dyeings and prints with particularly fine and clear shades are obtained, which, surprisingly, have a very good fastness to light.

The following examples are given for the purpose of illustrating the present invention:

EXAMPLE 1

27 parts by weight 1-amino-3-imino-isoindolenine; 7 parts by weight copper hydroxyethylamino-acetate; and 3 parts by weight of a mixture of equivalent parts of the diazoamino compound from 1-amino-2-methoxybenzene-5-carboxylic acid anilide; and 2-ethylamino-5-sulphobenzoic acid, on the one hand; and 1-(2',3'-hydroxynaphthoylamino)-2-methoxy - 5 - chlorobenzene, on the other hand, are pasted together with 30 parts by weight methanol; 30 parts by weight of an emulsifier prepared by the reaction of ethylene oxide with benzyl-p-hydroxydiphenyl in a molar ratio of 16:1 and 80 parts by weight hydroxyethyl thioether, and the paste is diluted with a solution of 30 parts by weight urea in 300 parts by weight water, to which 20 parts by weight 25% ammonia are added. To this mixture there are finally added 20 parts by weight of a leveling agent based on the monoethanolamine salt of lauroyl-sarcoside acid and the mixture is made up with water to 1000 parts by weight.

The material to be dyed is padded with this mixture on a two-roller foulard, dried in a hot flue and then condensed at 140° C. for 5 minutes either in a condensing device or on an evenly operating pin-stenter. The material is subsequently washed and soaped. Vivid, reddish-blue shades are obtained.

Instead of using dry heat, the dyestuffs can also be developed with neutral steam in one of the conventional steaming apparatus, for example, of the Mather-Platt type. After drying, the material is, in this case, introduced into the steaming apparatus, instead of a condensing apparatus, steamed at 102° C. for three to four minutes and then finished in an analogous manner.

EXAMPLE 2

27 parts by weight 1-amino-3-imino-isoindolenine; 7 parts by weight copper hydroxyethylamino-acetate; and 6 parts by weight of a mixture of equivalent parts of the diazoamino compound prepared from 1-amino-2-methoxybenzene-5-carboxylic acid anilide and 2-ethylamino-5-sulphobenzoic acid, on the one hand, and 1-(2',3'-hydroxynaphthoylamino)-2-methoxy - 5 - chlorobenzene, on the other hand, are pasted together with 30 parts by weight methanol; 30 parts by weight of an emulsifier prepared by the reaction of ethylene oxide with benzyl-p-hydroxydiphenyl in a molar ratio of 16:1 and 80 parts by weight hydroxyethyl thioether, and the paste is then diluted with a solution of 30 parts by weight urea in 300 parts by weight water, to which 20 parts by weight 25% ammonia are added. To this mixture there are finally added 20 parts by weight of a levelling agent based on 1,3-bis-(2-ethylhexyl)-glycerol ether sulphate and the mixture is made up with water to 1000 parts by weight.

The material to be dyed is padded on a two-roller foulard with this mixture, dried in a hot flue and then condensed at 140° C. for five minutes either in a condensing device or on an evenly operating pin-stenter. The material is subsequently washed and soaped. Vivid, reddish-blue shades are obtained which are even more markedly reddish than those described in Example 1.

Instead of using dry heat, the dyestuffs can also be developed with neutral steam in one of the conventional steaming apparatus, for example, of the Mather-Platt type. After drying, the material, is introduced, in this case, into the steaming apparatus, instead of the condensing apparatus, steamed at 102° C. for three to four minutes and then finished in an analogous manner.

EXAMPLE 3

27 parts by weight 1-amino-3-imino-isoindolenine; 7 parts by weight copper hydroxyethylamino-acetate; and 3 parts by weight of a mixture of equivalent parts of the diazoamino compound prepared from 1-amino-2-methoxybenzene-5-carboxylic acid anilide and 2-ethylamino-5-sulphobenzoic acid, on the one hand, and 1-(2',3'-hydroxynaphthoylamino)-2-methoxy - 5 - chlorobenzene, on the other hand, are pasted together with 30 parts by weight methanol; 30 parts by weight of an emulsifier prepared by the reaction of ethylene oxide with benzyl-p-hydroxydiphenyl in a molar ratio of 16:1 and 80 parts by weight hydroxyethyl thioether, and this paste is then diluted with a solution of 30 parts by weight urea in 300 parts by weight water, to which 20 parts by weight 25% ammonia are added. To this mixture there are finally added 20 parts by weight of a levelling agent based on the monoethanolamine salt of lauroyl-sarcoside acid and the mixture is then stirred into a conventional starch-tragacanth thickener of the type used for calico printing. The material is printed with this printing paste, dried in the usual manner in a drying chamber and subsequently steamed neutral in a Mather-Platt apparatus. The material is subsequently washed and soaped. Vivid, reddish prints are obtained.

EXAMPLE 4

27 parts by weight 1-amino-3-imino-isoindolenine; 7 parts by weight copper hydroxyethylamino-acetate; and 6 parts by weight of a mixture of equivalent parts of the diazoamino compound prepared from 4-nitro-2-amino-1-methoxybenzene and 2-ethylamino-5-sulpho-benzoic acid, on the one hand, and 2,3-hydroxynaphthoic acid-3'-nitroanilide, on the other hand, are pasted together with 30 parts by weight methanol; 30 parts by weight of an emulsifier prepared by the reaction of ethylene oxide with benzyl-p-hydroxydiphenyl in a molar ratio of 16:1 and 80 parts by weight hydroxyethyl thioether, and this paste is then diluted with a solution of 30 parts by weight urea in 300 parts by weight water, to which 20 parts by weight 25% ammonia are added. To this mixture there are finally added 20 parts by weight of a levelling agent based on 1,3-bis-(2-ethylhexyl)-glycerol ether sulphate and the mixture is then made up with water to 1000 parts by weight.

The material is padded with this mixture on a two-roller foulard, dried in a hot flue and then condensed at 140° C. either in a condensing device or on an evenly operating pin-stenter. The material is subsequently washed and soaped. Vivid, reddish-blue shades are obtained.

EXAMPLE 5

27 parts by weight 1-amino-3-imino-isoindolenine; 7 parts by weight copper hydroxyethylamino-acetate; and 3 parts by weight of a mixture of equivalent parts of the diazoamino compound prepared from 4-nitro-2-amino-1-methoxybenzene and 2-ethyamino-5-sulpho - benzoic acid, on the one hand, and 2,3-hydroxynaphthoic acid-3'-nitroanilide, on the other hand, are pasted together with 30 parts by weight methanol; 30 parts by weight of an emulsifier prepared by the reaction of ethylene oxide with benzyl-p-hydroxydiphenyl in a molar ratio of 16:1 and 80 parts by weight hydroxyethyl thioether, and this paste is then diluted with a solution of 30 parts by weight urea in 300 parts by weight water, to which 20 parts by weight 25% ammonia are added. To this mixture there are finally added 20 parts by weight of a levelling agent based on the monoethanolamine salt of the lauroyl-sarcoside acid and the mixture is made up with water to 1000 parts by weight.

The material is padded with this mixture on a two-roller foulard, dried in a hot flue and then condensed at 140° C. for five minutes either in a condensing device or on an evenly operating pin-stenter. The material is subsequently washed and soaped. Reddish-blue shades are obtained.

EXAMPLE 6

27 parts by weight 1-amino-3-imino-isoindolenine; 7 parts by weight copper hydroxyethylamino-acetate; and 3 parts by weight of a mixture of equivalent parts of the diazoamino compound prepared from 2-anisidine-4-diethylsulphamide and 5-sulpho-2-ethylamino-benzoic acid, on the one hand, and 2',3'-hydroxynaphthoyl - 2,4 - dimethoxy-5-chloro-aniline, on the other hand, are pasted together with 30 parts by weigth methanol; 30 parts by weight of an emulsifier prepared by the reaction of ethylene oxide with benzyl-p-hydroxydiphenyl in a molar ratio of 16:1 and 80 parts by weight hydroxyethyl thio-ether, and this paste is then diluted with a solution of 30 parts by weight urea in 300 parts by weight water, to which 20 parts by weight 25% ammonia are added. To this mixture there are finally added 20 parts by weight of a levelling agent based on the monoethanol-amine salt of the lauroyl-sarcoside acid and the mixture is made up with water to 1000 parts by weight.

The material is padded with this mixture on a two-roller foulard, dried in a hot flue and then condensed at 140° C. for five minutes either in a condensing device or on an evenly operating pin-stenter. Reddish-blue shades are also obtained in this case.

EXAMPLE 7

(a) If, in the process of Example 1, there are used instead of the first three components there described, 7 parts by weight 1-amino-3-imino-isoindolenine 2 parts by weight copper hydroxyethylamino-acetate and 24 parts by weight of a mixture of equivalent parts of the diazo-amino compound prepared from 1,4-diethoxy-2-amino-5-benzoylamino-benzene and methylamino-ethane-sulphonic acid, on the one hand, and 2',3' - hydroxynaphthoyl-aminobenzene, on the other hand, and this mixture is further used as described in Example 1, then a blue dyeing of good fastness properties is obtained.

(b) If, instead of the mixture stated in Example 7(a), there is used a mixture consisting of: 7 parts by weight 1-amino-3-imino-isoindolenine; 2 parts by weight nickel hydroxyethylamino-acetate; and 24 parts by weight or a mixture of equivalent parts of the diazoamino compound prepared from 5-chloro-2-toluidine and 22-ethylamino-5-sulphobenzoic acid, on the one hand, and 1-acetoacetyl-amino-4-chloro-2,5-dimethoxy-benzene, on the other hand, then a greenish-yellow dyeing of very good fastness properties is obtained.

(c) If, instead of the mixture stated in Example 7(a), there is used a mixture consisting of: 7 parts by weight 1 - amino - 3 - imino-5-methoxy-isoindolenine; 2 parts by weight copper hydroxyethylamino-acetate; 24 parts by weight of a mixture of equivalent parts of the diazoamino compound prepared from 2-amino-5-benzoylamino-1,4-diethoxybenzene and methylamino-ethane-sulphonic acid, on the one hand, and 2,3-hydroxy-anthracene-carboxylic acid-o-toluidide, on the other hand, then a grey dyeing of very good fastness properties is obtained.

What is claimed is:

1. In a process for dyeing or printing of fibre materials, the steps of applying to the fibre a two component dye-stuff mixture, the first dyestuff component comprising a mixture of:

(a) a member selected from the group consisting of:

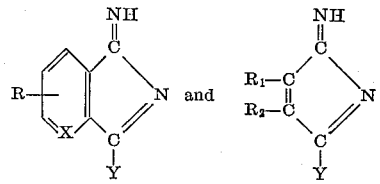

wherein R is a hydrogen, an alkoxy group or a phenyl radical, $R_1$ and $R_2$ are hydrogen or alkyl radicals, X is N or CH and Y is an amino group, a substituted amino group, an alkoxy group or a hydroxy ethyl group; said member being capable of forming a metal containing phthalocyanine or phthalocyanine-like dyestuff and (b) a metal compound capable of providing the metal for said phthalocyanine or phthalocyanine-like dyestuff;

the second component of said dyestuff mixture comprising a mixture of approximately equivalent parts of:

(a) a neutrally splittable stabilized diazo compound containing an aryl radical attached to the diazonium group which contains a lower alkoxy radical in the aryl radical attached to the diazonium group; said alkoxy radical being ortho to the diazonium group and (b) an ice color coupling component; and thereafter developing the dyestuffs on the fibre by a heat-treatment.

2. The process of claim 1, wherein the dyestuffs obtained on the fibre from each component vary in a ratio of phthalocyanine or phthalocyanine-like dyestuff to diazo dyestuff of 2:1 to 1:2.

3. The process of claim 1, wherein the heat treatment is carried out with dry heat or steam.

4. Fibres dyed or printed by the process of claim 1.

5. A two component dyestuff mixture in which the first dyestuff component comprises a mixture of:

(a) a member selected from the group consisting of:

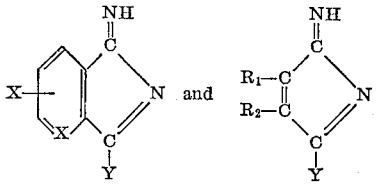

wherein R is a hydrogen, an alkoxy group or a phenyl radical, $R_1$ and $R_2$ are hydrogen or alkyl radicals, X is N or CH and Y is an amino group, a substituted amino group, an alkoxy group or a hydroxy ethyl group; said member being capable of forming metal containing phthalocyanine or phthalocyanine-like dyestuffs, and (b) a metal compound capable of providing the metal of said phthalocyanine or phthalocyanine-like dyestuffs;

and in which the second component of said dyestuff mixture comprises a mixture of approximately equivalent parts of:

(a) a neutrally splittable stabilized diazo compound containing an aryl radical attached to the diazonium group which contains a lower alkoxy radical in the aryl radical attached to the diazonium group; said alkoxy radical being ortho to the diazonium group, and (b) an ice color coupling component.

6. The two component dyestuff mixture of claim 5, wherein the member has the general formula:

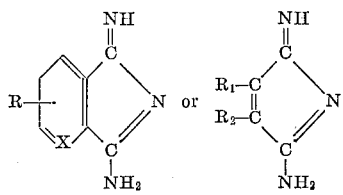

wherein R is a hydrogen, an alkoxy group or a phenyl Y is an amino group, a substituted amino X is N or CH, and $R_1$ and $R_2$ are hydrogen or alkyl radicals.

7. The two component dyestuff mixture of claim 5, wherein the member is 1-amino-3-imino-isoindolenine.

8. The two component dyestuff mixture of claim 5, wherein the neutrally splittable stabilized diazo compound is the coupling product of amino group-containing diazo precursors of the benzene or diphenyl series, which are free of water-solubilizing groups, with secondary amino-benzene-carboxylic acids.

9. The two component dyestuff mixture of claim 8, wherein the amino group-containing precursor of the benzene or diphenyl series is 1-amino-2-methoxy-benzene-5-carboxylic acid anilide,
2-amino-5-benzoylamino-1,4-diethoxybenzene,
2-amino-5-benzoylamino-1,4-dimethoxybenzene,
1-amino-2,5-dimethoxy-4-benzonitrile,
1,4-dimethoxy-2-amino-phenyl-5-n-butyl-sulphone,
4-amino-2,5-dimethoxy-2',6'-dichloro-4'-nitroazobenzene,
4-amino-3-methoxy-6,4'-dimethyl-2'-nitroazobenzene,
5-nitro-2-amino-1-methoxybenzene,
4-nitro-2-amino-1-methoxybenzene,
2-amino-1-methoxybenzene,
2-amino-1-methoxybenzene-4-ethylsulphone,
2-amino-1-methoxybenzene-4-sulphonamide,
2-amino-1-methoxybenzene-4-dimethylsulphonamide,
2-amino-1-methoxybenzene-4-diethylsulphonamide,
4-chloro-2-amino-1-methoxybenzene,
2-amino-1-methoxybenzene-4-benzylsulphone,
1-amino-2-methoxy-5-nitrobenzene,
4-amino-4'-(p-aminophenylamino)-2-ethoxy-5-methyl-azobenzene,
4-amino-4'-nitro-2,5-dimethoxyazobenzene,
3-amino-6-benzoylamino-4-methoxytoluene,
dianisidine,
2-anisidine-4-diethylsulphamide,
1,4-diethoxy-2-amino-5-benzoylaminobenzene,
or
5-chloro-2-toluidine.

10. The two component dyestuff mixture of claim 8, wherein the secondary aminobenzene carboxylic acid is 1-alkylamino-4-sulphobenzene-2-carboxylic acids,
1-alkylamino-5-sulphobenzene-2-carboxylic acids,
N-alkylaminobenzene-o-carboxylic acids,
N-alkylaminochlorinated-benzene-o-carboxylic acids,
4-methoxyphenyl-glycine-o-carboxylic acid,
N-hydroxyethylanthranilic acid,
N-methoxyanthranilic acid,
N-alkylanthranilic acid,
N-phenyl-glycine-alkyl-ester-o-carboxylic acids,
N-phenyl-glycine-amido-o-carboxylic acid,
1-N-sulpho-methylaminobenzene-2-carboxylic acid,
or
methylamino-ethane-sulphonic acid.

11. The two component dyestuff mixture of claim 5, wherein the metal compound is copper acetate, copper alkylamino acetate, nickel alkylamino acetate, or cobalt alkylamino acetate.

12. The two component dyestuff of claim 5, wherein the ice color coupling component is 1-(2',3'-hydroxynaphthoylamino)-2-methoxy-5-chlorobenzene, 2,3-hydroxynaphthoyl-2,4-dimethoxy-5-chloroaniline, 2',3'-hydroxynaphthoylaminobenzene, 1-acetoacetylamino-4-chloro-2,5-dimethoxybenzene, or 2,3-hydroxyanthracene-carboxylic acid toluidine.

13. The two component dyestuff of claim 5, wherein the member is 1-amino-3-iminoisoindolenine, the metal compound is copper hydroxyethylamino acetate, the diazo compound is prepared from 1-amino-2-methoxy-benzene-5-carboxylic acid anilide and 2-ethylamino-5-sulphobenzoic acid and the ice color coupling component is 1-(2',3'-hydroxynaphthoylamino)-2-methoxy-5-chlorobenzene.

References Cited

UNITED STATES PATENTS

| 2,010,854 | 8/1935 | Ellis et al. | 8—26 |
| 2,229,049 | 1/1941 | Dahlen et al. | 8—26 |
| 2,349,091 | 5/1944 | Haddock | 8—45 |

NORMAN G. TORCHIN, Primary Examiner

J. E. CALLAGHAN, Assistant Examiner

U.S. Cl. X.R.

8—45

UNITED STATES PATENT OFFICE
CERTIFICATE OF CORRECTION

Patent No. 3,479,126　　　　　　　　　　　November 18, 1969

Bernhard Kramer et al.

It is certified that error appears in the above identified patent and that said Letters Patent are hereby corrected as shown below:

In the heading to the printed specification, after line 8, insert -- Claims priority, application, Germany, F46,003, May 8, 1965 --. Column 2, line 37, "(oprphyrazines)" should read -- (porphyrazines) --. Column 3, line 76, "dimethyl-sulphonamide or" is a repeat and should be deleted. Column 4, line 2, "lamino-" should read -- 1-amino- --; line 45, "o-amineo-alkoxy-aryl-compounds" should read -- o-amino-alkoxy-aryl compounds --. Column 7, line 21, "by weigth" should read -- by weight --; line 55, "weight or" should read -- weight of --; line 57, "22-ethylamino-5-" should read -- 2-ethylamino-5- --. Column 8, Claim 5, the formula should appear as shown below:

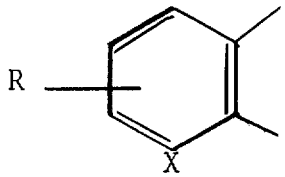

Column 9, lines 15 to 16, "a phenyl Y is an amino group, a substituted amino" should read -- a phenyl radical --.

Signed and sealed this 16th day of June 1970.

(SEAL)
Attest:

EDWARD M. FLETCHER, JR.　　　　　　　　WILLIAM E. SCHUYLER, JR.
Attesting Officer　　　　　　　　　　　Commissioner of Patents